(12) United States Patent
Ashbrook et al.

(10) Patent No.: US 12,302,793 B1
(45) Date of Patent: May 20, 2025

(54) OPERATOR FEEDBACK SYSTEM FOR RIDING LAWN MOWER

(71) Applicant: Hydro-Gear Limited Partnership, Sullivan, IL (US)

(72) Inventors: David J. Ashbrook, Zionsville, IN (US); Damon J. Hoyda, McCordsville, IN (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

(21) Appl. No.: 18/151,298

(22) Filed: Jan. 6, 2023

Related U.S. Application Data

(63) Continuation of application No. 16/598,616, filed on Oct. 10, 2019, now Pat. No. 11,547,052.
(Continued)

(51) Int. Cl.
| | |
|---|---|
| *G06F 3/16* | (2006.01) |
| *A01D 34/90* | (2006.01) |
| *A01D 75/18* | (2006.01) |
| *A01D 75/28* | (2006.01) |
| *B60Q 9/00* | (2006.01) |

(Continued)

(52) U.S. Cl.
CPC ............ *A01D 75/28* (2013.01); *A01D 34/90* (2013.01); *A01D 75/18* (2013.01); *B60Q 9/00* (2013.01); *G06F 3/167* (2013.01); *H04R 1/1008* (2013.01); *H04R 1/1041* (2013.01); *A01D 2101/00* (2013.01); *H04R 2420/07* (2013.01)

(58) Field of Classification Search
CPC ........ A01D 75/28; A01D 34/90; A01D 75/18; A01D 2101/00; B60Q 9/00; G06F 3/167; H04R 1/1008; H04R 1/1041; H04R 2420/07
See application file for complete search history.

(56) References Cited

U.S. PATENT DOCUMENTS

| | | | |
|---|---|---|---|
| 6,152,247 | A | 11/2000 | Sporrer et al. |
| 6,600,981 | B2 | 7/2003 | Ruffner |

(Continued)

FOREIGN PATENT DOCUMENTS

CN 207804199 9/2018

OTHER PUBLICATIONS

Kumar, et al., "Blind Navigation System Using Artificial Intelligence," IRJET, vol. 5, Issue 3, Mar. 2018, 5 pp.
(Continued)

*Primary Examiner* — Robert J Michaud
(74) *Attorney, Agent, or Firm* — Neal, Gerber & Eisenberg LLP

(57) ABSTRACT

A system for providing feedback to a vehicle operator includes a lawn vehicle including a movement mechanism and at least one rotatable blade, a circuit capable of residing on the lawn vehicle, a sensor associated with the lawn vehicle and capable of sensing at least one characteristic of the lawn vehicle, a data packet representative of the at least one characteristic of the lawn vehicle, a transmitter connected to the circuit and to a computing device, the transmitter capable of transmitting the data packet to the computing device, the computing device connected to one of a speaker or visual display, the speaker or visual display capable of outputting audible or visual feedback representing the at least one characteristic of the lawn vehicle.

20 Claims, 2 Drawing Sheets

Related U.S. Application Data

(60) Provisional application No. 62/744,003, filed on Oct. 10, 2018.

(51) Int. Cl.
  *H04R 1/10* (2006.01)
  *A01D 101/00* (2006.01)

(56) References Cited

U.S. PATENT DOCUMENTS

| | | | |
|---|---|---|---|
| 7,107,132 | B2 | 9/2006 | Dean |
| 7,134,276 | B1 * | 11/2006 | Langenfeld ............ F16D 49/00 |
| | | | 60/487 |
| 7,239,944 | B2 | 7/2007 | Dean |
| 7,904,219 | B1 | 3/2011 | Lowrey et al. |
| 8,498,425 | B2 | 7/2013 | Graylin |
| 8,572,939 | B2 | 11/2013 | Koike et al. |
| 9,137,943 | B2 | 9/2015 | Einecke et al. |
| 9,765,870 | B1 | 9/2017 | Fox et al. |
| 9,794,652 | B2 | 10/2017 | Nohra et al. |
| 9,804,604 | B2 | 10/2017 | Mattsson et al. |
| 10,000,152 | B1 | 6/2018 | Scalea et al. |
| 10,058,031 | B1 | 8/2018 | Brown et al. |
| 10,514,672 | B1 | 12/2019 | Brooks et al. |
| 10,878,030 | B1 * | 12/2020 | Lambert ............... G06F 16/743 |
| 2012/0316884 | A1 | 12/2012 | Rozaieski et al. |
| 2015/0224845 | A1 * | 8/2015 | Anderson ................ F03G 7/08 |
| | | | 701/37 |
| 2016/0192073 | A1 | 6/2016 | Poornachandran et al. |
| 2017/0361468 | A1 | 12/2017 | Cheuvront et al. |
| 2019/0113927 | A1 * | 4/2019 | England ............... G06F 16/285 |
| 2019/0198015 | A1 * | 6/2019 | Cherney ............. G05D 1/0011 |
| 2019/0370660 | A1 | 12/2019 | Wong et al. |

OTHER PUBLICATIONS

Levy, "I welcome our robot overlords, as long as they'll mow my lawn like this LG gadget does," GeekWire, Jan. 12, 2018, 2 pp.

Onvocal, "OV™ intelligent headphones featuring Amazon Alexa integration now available for purchase," Press Release, Apr. 17, 2017, 3 pp.

Thompson, "LG's robot mower uses GPS to keep your grass cut," CNET, Aug. 31, 2017, 2 pp.

Thompson, "Robotic lawn mowers get voice assistant, GPS upgrades," CNET, Mar. 3, 2018, 3 pp.

Yamamoto, et al., "Establishment and Experimental Demonstration of Distant Speech Recognition System for Communication Robot," Honda Research Inst. Japan Co., Ltd., Sep. 1, 2017, 8 pp.

* cited by examiner

OPERATOR FEEDBACK SYSTEM FOR RIDING LAWN MOWER

CROSS REFERENCE

This application is a continuation of U.S. patent application Ser. No. 16/598,616, filed on Oct. 10, 2019, which claims the benefit of U.S. Provisional Patent Application No. 62/744,003, filed on Oct. 10, 2018, both of which are incorporated by reference herein in their entireties.

FIELD OF THE INVENTION

This application relates to transmitting lawn vehicle information to a vehicle operator.

BACKGROUND AND SUMMARY

Modern lawn vehicles incorporate electrical components that communicate with one another and monitor different vehicle conditions, such as the status of engine start interlocks, engine temperature or fuel level. A computer can manage the interpretation and transmission of the data representative of those vehicle conditions. Because a lawn vehicle operator can use many of these data, modern lawn vehicles will benefit from communicating those data in ways that reduce operator distraction while keeping the operator apprised of relevant vehicle conditions. An audible feedback system presents an opportunity to reduce such distraction while keeping the operator informed.

The Detailed Description, below, and its accompanying drawings, will provide a better understanding of the invention and set forth embodiments that indicate some of the ways to employ the invention.

DETAILED DESCRIPTION

This description describes one or more embodiments and should not limit the invention to those embodiments. The description explains principles of the invention to enable one of ordinary skill in the art to understand and apply the principles to practice both the described embodiments and other embodiments that may come to mind. The invention's scope should cover all embodiments that might fall within the scope of the claims, either literally or under the doctrine of equivalents.

A. Introduction and Summary

Figure 1:
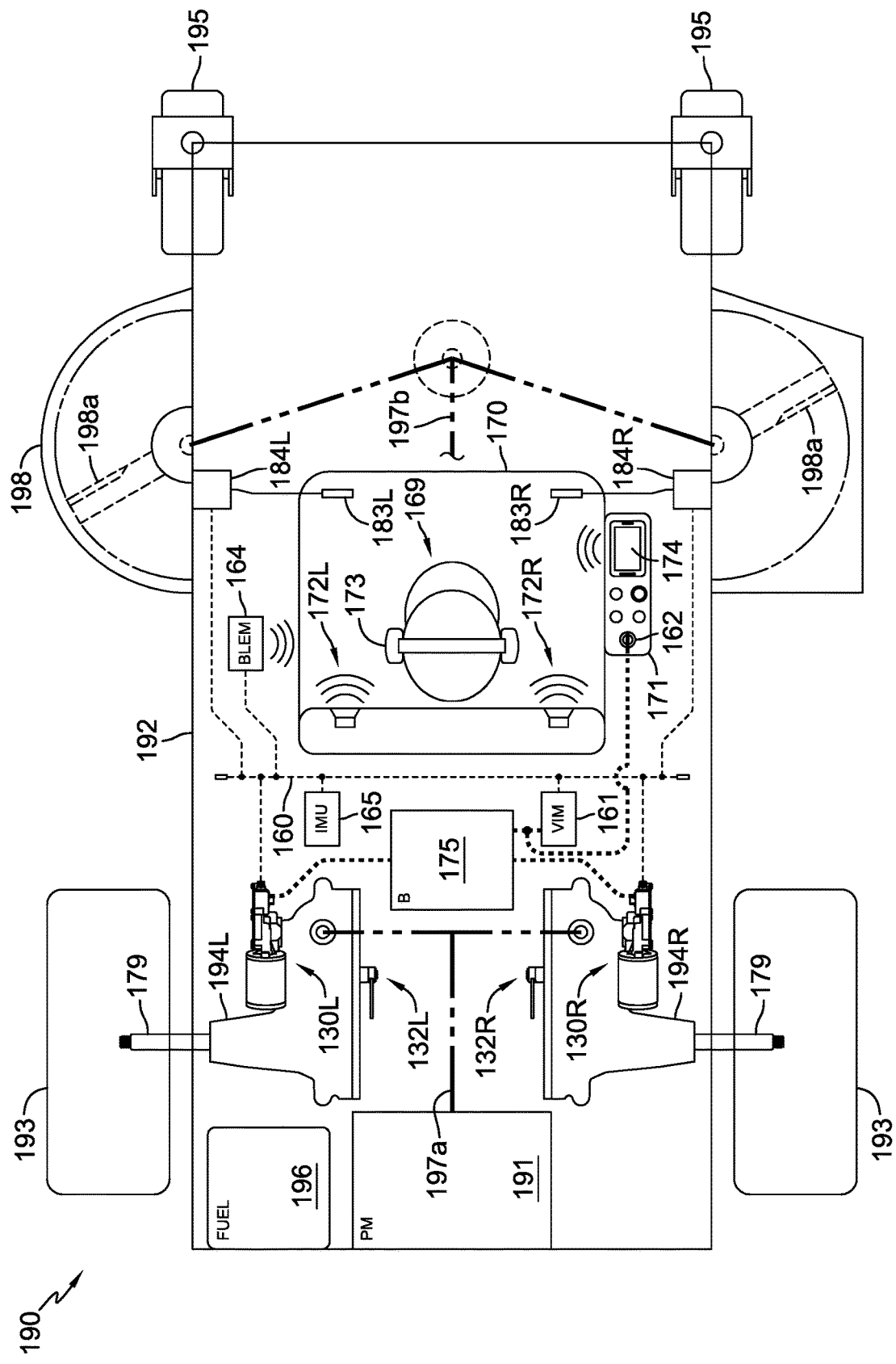
FIG. 1 is a schematic view of an exemplary lawn vehicle.
Figure 2:
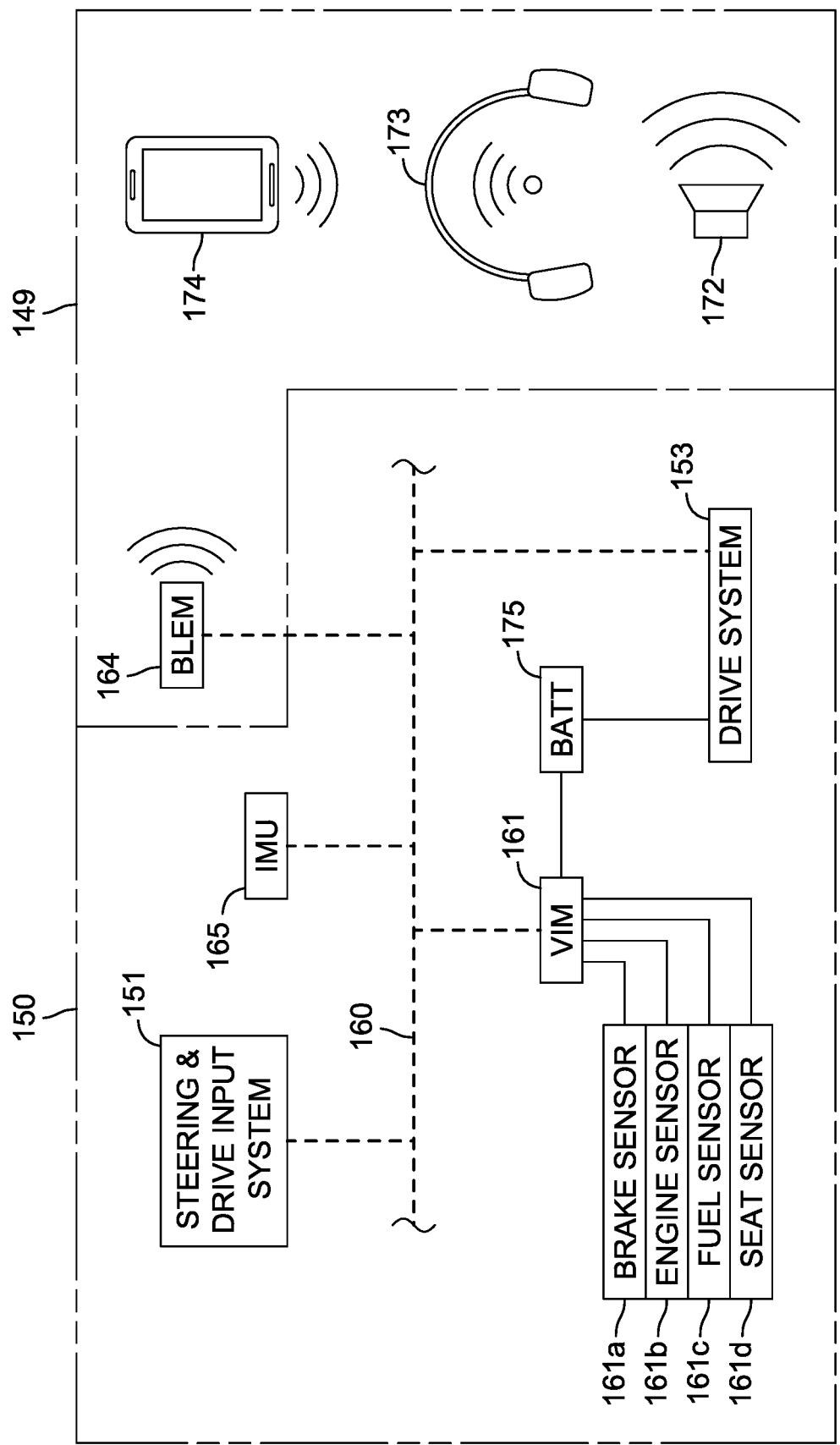
FIG. 2 is a diagram of an exemplary audible feedback system for a vehicle drive and control system.

The embodiments of an audible feedback system in this application use audible messages or tones to inform operator 169 of conditions related to lawn vehicle 190. Referring to FIGS. 1-2, an exemplary zero-turn lawn vehicle utilizing such an audible feedback system includes a Controller Area Network, or CAN-Bus 160, on which different sensors and functional modules continually deposit data that reflect conditions of lawn vehicle 190. Commonly-owned U.S. Pat. No. 10,058,031 (the entire disclosure of which is incorporated herein by reference) discloses an exemplary CAN-Bus of the type represented here.

Referring to FIG. 2, exemplary vehicle drive and control system 150 includes, in part, sensors 161a-161d directly connected to Vehicle Integration Module (VIM) 161, and an Inertial Measurement Unit module 165 (IMU) communicating with VIM 161 by means of CAN-Bus 160. VIM 161 can be thought of as a vehicle controller that monitors vehicle and safety interlock status via (i) messages received on CAN-Bus 160, and (ii) inputs from various sensors, switches, relays and meters, both analog and digital, directly connected to the I/O bus of VIM 161. Additional components of vehicle drive and control system 150 include the drive system 153 subject to control, a battery 175 to power CAN-Bus 160 by way of VIM 161 when key switch 162 is rotated to the "On/Run" position, and a steering and drive input system 151 configured to place the speed, acceleration and direction inputs of an operator 169 onto CAN-Bus 160. Exemplary audible feedback system 149 includes a Bluetooth Low Energy Module (BLEM) 164 connected to CAN-Bus 160, a Bluetooth-capable computing device 174, and also speakers 172 and headphones 173, which can be utilized separately or in combination.

VIM 161 and IMU 165 intake and generate data related to lawn vehicle 190, which CAN-Bus 160 receives and Bluetooth Low Energy Module (BLEM) 164 transmits to computing device 174, in whole or in part. Computing device 174, which connects to speaker(s) 172 and headphones 173 via hardwire or Bluetooth, then processes those data, for example through a mobile application, and presents audible messages or tones to operator 169, keeping that operator apprised of the lawn mower's operating conditions while minimizing the distractions that reading messages on the screen of computing device 174 might cause.

B. Vehicle Overview

FIG. 1 shows exemplary lawn vehicle 190, which is, in this embodiment, a zero-turn lawn mower. Despite this zero-turn lawn mower disclosure, the audible feedback system disclosed in this application can inform operators of lawn tractors, walk-behind lawn mowers, and stand-on lawn mowers, among other lawn vehicles, about relevant vehicle conditions. This section will discuss the layout of lawn vehicle 190, as situated across lawn vehicle frame 192 in FIG. 1.

Lawn vehicle 190 includes prime mover 191, which can be an internal combustion engine (or an electric motor, in another vehicle embodiment, not shown). Prime mover 191 powers (i) hydrostatic transaxles 194L and 194R via belt and pulley system 197a, and (ii) blades 198a of mowing deck 198 via belt and pulley system 197b. Both of these respective "drive systems" are subject to the control logic distributed between VIM 161, the motor controllers (not shown) of electric actuators 130L and 130R, and various system modules. Transaxles 194L and 194R can resemble those disclosed in the commonly-owned U.S. Pat. Nos. 6,152,247 and 7,134,276, both of which are incorporated herein by reference in their entireties. Prime mover 191 powers transaxles 194L and 194R and, accordingly, their respective output shafts or axles 179 to rotate wheels 193 and propel lawn vehicle 190. The transaxles include corresponding brakes 132L and 132R, which operator 169 can engage and disengage by means of a brake lever (not shown) adjacent operator seat 170. A brake sensor 161a communicates the status of the brake lever via direct connection to VIM 161. Brakes 132L and 132R may function like the exemplary parking brake disclosed in the commonly-owned U.S. Pat. No. 6,152,247, mentioned above. Fuel tank 196 stores and supplies liquid fuel for prime mover 191; although, if vehicle 190 uses an electric motor (not shown) as a prime mover 191, a battery power source can replace fuel tank 196.

Lawn vehicle 190 also includes control levers 183L and 183R, the movement of which enables operator 169 to control transaxles 194L and 194R. That is, control lever 183L (or 183R) cooperates with a position sensor (or potentiometer) of speed control mechanism 184L (or 184R) to place vehicle movement commands on CAN-Bus 160 for processing by VIM 161 in conjunction with various vehicle state messages, resulting in transmission of command messages from VIM 161 directed to the motor controller (not shown) of electric actuator 130L (or 130R). Consequently, movement of control lever 183L (or 183R) corresponds to an adjustment of electric actuator 130L (or 130R) to modify the rotational speed and direction of output shafts 179. This enables lawn vehicle 190 to move in forward and reverse, and to execute turns. The commonly-owned U.S. Pat. No. 9,765,870, which is incorporated herein by reference in its entirety, discloses control levers substantially similar to exemplary control levers 183L and 183R. Further, other user input devices can receive an operator's movement commands to control lawn vehicle 190, such as a CAN-enabled steering wheel, foot pedals, or joystick placed in communication with VIM 161. Such devices, along with control levers 183L and 183R, and speed control mechanisms 184L and 184R, are exemplary components of steering and drive input system 151.

CAN-Bus 160 facilitates the flow of messages and commands related to operator control inputs and vehicle conditions. CAN-Bus 160 connects various vehicle components so those components can interact with one another. CAN-Bus 160 connects to VIM 161, which being capable of receiving and interpreting both digital and analog signals, collects and processes data from various components and transmits resultant data over CAN-Bus 160. Correspondingly, BLEM 164 can transmit CAN-Bus data to computing device 174, which can then process those data and present output to operator 169 via one or more Bluetooth-capable devices. For purposes of this disclosure, all connections, communications, and conjoining, among similar features, contemplate wired and wireless communication, direct and indirect connections, and multidirectional power and data transfer, unless otherwise stated.

Operator 169 sits in operator seat 170 within reach of control levers 183L and 183R and also control panel 171. Key switch 162, which permits battery 175 to power VIM 161 in the "On/Run" position and further initiates the ignition of prime mover 191 in a momentary "Start" position, can be situated on control panel 171. Other devices, such as speakers 172L and 172R, headphones 173, and computing device 174, are situated within earshot or sight of operator 169, keeping operator 169 apprised of conditions and data related to lawn vehicle 190. For example, computing device 174 may be located, either removably or permanently, on control panel 171.

Battery 175 can power the various drive and control system components either directly, through key switch 162 or through VIM 161.

C. Audible Feedback System

FIG. 2 shows the components of exemplary audible feedback system 149 for lawn vehicle 190: BLEM 164, one or more speakers 172, headphones 173, and computing device 174. The following paragraphs describe these components and the audible feedback process.

1. System Overview

FIG. 2 illustrates the connection between exemplary audible feedback system 149 and vehicle drive and control system 150 via CAN-Bus 160. Vehicle drive and control system 150 includes VIM 161, which communicates with vehicle sensors, switches, relays, and meters (analog or digital). Although not shown in FIG. 1 or FIG. 2, VIM 161 may include a microprocessor, a memory, and a CAN-Bus interface to communicate with CAN-Bus 160. As such, VIM 161 can monitor, receive, and interpret steering commands, engine characteristics, and environmental features (e.g. terrain slope), among other data, from the messages that reside on CAN-Bus 160. In practice, VIM 161 receives command signals, processes those signals within 5 ms, and transmits the subsequent data, so those data are not more than 5 ms old when BLEM 164 transmits the data to computing device 174.

BLEM 164 is configured to transmit data to a Bluetooth-compatible external device, such as computing device 174. In the alternative, however, a near-field communications module, a Wi-Fi router, a cellular transceiver, or a satellite transceiver can transmit data from CAN-Bus 160 to any compatible computer, tablet, communications device, or web server. Accordingly, other wireless connection types are contemplated herein, utilizing by way of example only various frequencies, such as unlicensed bands, and protocols, such as Z-wave, ZigBee and Apple Communications.

BLEM 164 is configured to facilitate the sharing of data residing on CAN-Bus 160 with outside devices which in turn deliver messages derived from those data in format(s) operator 169 can hear and understand. Computing device 174 can include handheld or worn devices such as smartphones, smart watches, and tablets. A mobile application containing the necessary programming to convert the myriad CAN frames on CAN-Bus 160 to intelligible, audible operator messaging can be uploaded to these devices. A mobile application permits the easy push of upgrades to users. As previously explained, computing device 174 can also be incorporated into, or be removably carried on, lawn vehicle 190. In the alternative, BLEM 164 may be upgraded to contain the processing and programming necessary to produce audible operator messaging which may be directly transmitted to headphones 173 for example.

Computing device 174 includes a processor to process the data that BLEM 164 transmits from CAN-Bus 160, and a screen to display system information from CAN-Bus 160 to operator 169. Computing device 174 can also include memory and appropriate input or output devices for communicating data with CAN-Bus 160 or other external devices, such as speakers 172, headphones 173, or a separate server that might collect data relating to conditions of multiple lawn vehicles. Computing device 174 may also be utilized to configure BLEM 164 to transmit only select, relevant data from CAN-Bus 160.

2. Vehicle Data Collection

As mentioned above, CAN-Bus 160 and VIM 161 accommodate vehicle sensors, switches, relays, and meters. These components can provide CAN-Bus 160 with data from all over lawn vehicle 190. FIG. 2 shows examples of the kinds of components that provide data to CAN-Bus 160, although these are only exemplary: brake sensor 161a, engine sensor 161b, fuel sensor 161c, seat sensor 161d, and IMU 165, which operates, essentially, as an attitude sensor. In the exemplary embodiment in FIG. 2, digital components can connect directly to CAN-Bus 160 or connect to CAN-Bus 160 via VIM 161, while analog components connect to CAN-Bus 160 via VIM 161, although alternative arrangements can permit different connective capabilities. FIG. 2 shows sensors 161a-161d connected to CAN-Bus 160 via VIM 161, while IMU 165 connects directly to CAN-Bus 160.

These five sensors, their descriptions and arrangements as disclosed in this application, are exemplary and can operate together, individually, or in various combinations over CAN-Bus 160. In FIG. 2, although sensors 161a-161d connect to CAN-Bus 160 via VIM 161, being typically analog sensors, and IMU 165 connects directly to CAN-Bus 160, CAN-capable versions of sensors 161a-161d and others can connect directly to CAN-Bus 160, and IMU 165 can connect to VIM 161. Indeed, any combination of sensors can connect to CAN-Bus 160 or VIM 161 or both. Moreover, as an alternative arrangement, lawn vehicle 190 can accommodate different sensors without CAN-Bus 160. That is, one or more sensors can each directly connect to BLEM 164 so BLEM 164 can transmit relevant data to one or more external devices. Finally, although not shown in FIG. 2, lawn vehicle 190 can incorporate alternative and additional known sensors such as, for example, temperature sensors for electric actuators 130L and 130R.

Brake sensor 161a can sense, for example, whether brakes 132L and 132R are engaged or not. In the present embodiment, if brake sensor 161a senses brake engagement, a programmed interlock will prevent electronic actuators 130L and 130R from moving hydrostatic transaxles 194L and 194R out of neutral, so that movement of control levers 183L and 183R and the corresponding transmission of movement commands by speed control mechanisms 184L and 184R will not result in movement of lawn vehicle 190. In the case of hydrostatic transaxles 194L and 194R, this can prevent damage to a typical motor cylinder block brake. Brake sensor 161a can comprise, for example, a known linear position sensor that includes a plurality of Hall Effect transducers to detect the positioning of a brake lever adjacent operator seat 170.

An engaged signal from brake sensor 161a is also utilized by a programmed interlock associated with the start sequence for prime mover 191. Brakes 132L and 132R must be engaged along with neutral switches or sensors indicating a neutral position for control levers 183L and 183R, a PTO switch or sensor (not shown) indicating disengagement, electric actuator position sensors (not shown) indicating a neutral position, and seat sensor 161d indicating the presence of operator 169 before prime mover 191 can be started.

Engine (or the like) sensor 161b can sense, in real-time, various engine, motor, or transmission parameters such as, for example, engine RPM (or electric motor RPM), oil pressure, or coolant temperature. Engine sensor 161b can comprise any known and compatible J1939 electric sensor that provides data from locations on or within prime mover 191 and hydrostatic transaxles 194L and 194R. In a similar vein, fuel sensor 161c senses whether the fuel level has dipped below a cautionary threshold to avoid operating lawn mower 190 to the point of running out of fuel. Fuel sensor 161c can comprise any known and compatible J1939 fuel level converter that interacts with a physical liquid fuel sensor to convert analog fuel level information into digital J1939 CAN-Bus data.

Seat sensor 161d can sense, for example, whether operator 169 is seated in the seat, to prevent the operator either from starting lawn vehicle 190 when no one is in the seat, or to stop the engine or motor when operator 169 leaves the seat. Seat sensor 161d can comprise a load sensor that senses whether an electric switch on the load sensor is open (generating a low voltage signal) or closed (generating a high voltage signal).

IMU 165 senses attitude: roll, pitch, and yaw of lawn vehicle 190. IMU 165 can include, for example, a multi-axis (3-axis, for example) magnetometer, accelerometer, and gyroscope, a microprocessor, and a CAN interface for communicating data over CAN-Bus 160. The microprocessor can fuse the output of the multi-axis magnetometer, multi-axis accelerometer, and multi-axis gyroscope so IMU 165 can conduct 9-axis motion processing, including 3-axis accelerometer processing, 3-axis gyroscope processing, and 3-axis magnetometer processing to inform operator 169 of vehicle levelness or movement irregularities. VIM 161 monitors such data and may adjust vehicle speed or even direction in the event a roll angle or pitch angle of a threshold number of degrees is reached.

3. Audible Feedback System in Action

The following paragraphs represent a simplified, exemplary description of one process relevant to this application. The paragraphs below describe how audible feedback system 149 informs operator 169 about the engagement of brakes 132L and 132R when operator 169 tries to move control levers 183L and 183R forward.

First, during the "sensing" phase, at an exemplary moment, operator 169 sits in operator seat 170 with lawn vehicle 190 turned on, but stationary, with each of control levers 183L and 183R in the neutral position. Both brakes 132L and 132R are engaged, which creates a "CAN frame" (a data packet representing a (1) state, mode, orientation, or condition of lawn vehicle 190 or (2) characteristic of the environment surrounding lawn vehicle 190) along CAN-Bus 160 representing brake engagement, which may interact with various programmed interlocks to prevent a reaction to forward control lever movement. Further, when operator 169 starts to move control levers 183L and 183R forward, the attempted movement creates a different set of CAN frame along CAN-Bus 160 generated by speed control mechanisms 184L and 184R that represent dual control lever movement. In other words, for purposes of this example, and for ease of identification, a "Brake CAN Frame," a "Forward Left Lever CAN Frame" and a "Forward Right Lever CAN Frame" are generated at this exemplary instant.

This example's discussion of only these three CAN frames is purely exemplary and meant for ease of understanding. In practice, CAN-Bus 160 can simultaneously accommodate numerous CAN frames from various sensors and components placed throughout lawn vehicle 190, and VIM 161 and/or the controllers (not shown) of electric actuators 130L and 130R can process and react to numerous CAN frames. The same can be said for computing device 174.

Second, at the "transmission" phase, the Brake CAN Frame and each of the Forward Lever CAN Frames mentioned above, among other data, reside on CAN-Bus 160. BLEM 164 transmits these three CAN frames to computing device 174 along with other vehicle system state data. The connection between BLEM 164 and computing device 174 comprises a generic Bluetooth profile, although CAN-Bus 160 can transmit data via alternative wireless or wired connections to any external, compatible computing device.

Third, in the "computing" phase, computing device 174 processes the Brake CAN Frame and each of the Forward Lever CAN Frames, among other data, given that CAN-Bus 160 accommodates, and BLEM 164 continually transmits, data related to various other conditions of lawn vehicle 190. In practice, computing device 174 continuously receives and processes CAN-Bus data from BLEM 164, so computing device 174 can present those data to operator 169 in an understandable format. That is, computing device 174 makes sense of these numerous data, identifying idiosyncrasies and patterns for operator 169. For example, computing device 174 will process the combination of the Brake CAN Frame and each of the Forward Lever CAN Frames, which represent the brakes' engagement despite the operator's effort to move both levers forward, and determine that these simultaneous conditions mean operator 169 should receive feedback. Computing device 174 generates the message operator 169 needs to follow, in this exemplary instance, indicating operator 169 cannot move vehicle 190 until he or she disengages brakes 132L and 132R.

Fourth, in the "delivery" phase, computing device 174 presents the processed data in at least one of several formats. Although computing device 174 can inform operator 169 about the Brake CAN Frame and each of the Forward Lever CAN Frames visually, using a screen, computing device 174 can also connect to speaker 172 or headphones 173 or both to provide operator 169 with audible feedback. Continuing with the same example, the generation of the Brake CAN Frame and the Forward Lever CAN Frames along CAN-Bus 160 results (after transmission to computing device 174) in the presentation of a visual message on computing device 174 displaying "Brakes Engaged. Release Brakes to Proceed." Further, speaker 172 or headphones 173 or both can play a voice command of this statement, which can help operator 169 avoid looking at computing device 174. The voice command may be generated by text-to speech functionality of the mobile operating system resident on computing device 174 or pre-recorded spoken messages. In a simpler version, an audible tone may advise the operator to check the display screen of computing device 174 to resolve his forward movement issue. The tone may be generated by an operating system's incorporated alert sounds, pre-recorded tones, or generated tones.

In reference to the vehicle start sequence, exemplary troubleshooting voice commands may include the following:
   a. "Brake Required to Start"
   b. "Lap Bar Must Be in Neutral to Start"
   c. "Operator Must Be Present to Start"
   d. "PTO Must Be Off to Start"
   e. "Electric Actuators Must Be in Neutral to Start."

In reference to processing IMU data, computing device 174 may generate, for example, the following voice commands:
   a. "Warning Excessive Roll Angle"
   b. "Warning Excessive Pitch Angle"
   c. "Warning, Excessive Roll, 21 Degrees," where specific data is incorporated.

The prior examples are but a few of the vehicle state audible feedback messages that may be delivered to an operator by the audible feedback system 149, depending on the sensor and component package provided on a vehicle. Engine management warnings, low fuel warnings, maintenance advisements, advanced control feature engagement or disablement, such as "Dynamic Stability Assist Engaged," are also within the scope of the present invention.

Headphones 173 can combine sound-delivery features with noise protection features, such as a hardened-plastic, earmuff structure, and sound-insulating foam to dampen external machinery noise. Noise protection earmuffs typically use the sound-insulating foam to press against the sides of the user's head, around the ears, to encapsulate, or substantially encapsulate, the entire ear. Regardless, through either speaker 172 or headphones 173, the voice command is loud enough to alert operator 169 and overcome surrounding noise. As such, audible feedback system 149 provides operator 169 with an alternative medium that improves safety of operator 169 and surrounding people and property.

While this Detailed Description expounds upon specific embodiments of the invention, those skilled in the art will appreciate that one could modify or adapt those embodiments based on the teachings of the Detailed Description. Accordingly, the disclosed arrangements are merely illustrative and should not limit the invention's scope.

What is claimed is:

1. A vehicle network and control system for use on a lawn mowing vehicle capable of traversing sloped terrain, the vehicle network and control system comprising: a CAN-Bus residing on the lawn mowing vehicle; a plurality of sensors associated with the lawn mowing vehicle and linked to the CAN-Bus, wherein each sensor is capable of sensing at least one characteristic of the lawn mowing vehicle, the plurality of sensors comprising an inertial measurement unit (IMU) capable of generating an attitude CAN frame representative of attitude data of the lawn mowing vehicle, the attitude data comprising a roll angle and a pitch angle of the lawn mowing vehicle; a first control mechanism associated with a first transaxle to control an output thereof, the first control mechanism being linked to the CAN bus and capable of generating a first control CAN frame representative of a status of the first control mechanism; a second control mechanism associated with a second transaxle to control an output thereof, the second control mechanism being linked to the CAN bus and capable of generating a second control CAN frame representative of a status of the second control mechanism; a transmitter connected to the CAN-Bus and configured to be connected to a computing device associated with the lawn mowing vehicle, the transmitter capable of transmitting each of the CAN frames to the computing device; and the computing device being configured to assess the CAN frames and to generate a command signal used to provide feedback to an operator of the lawn mowing vehicle, the feedback identifying an excessive roll angle or an excessive pitch angle when indicated by the attitude data.

2. The vehicle network and control system of claim 1, wherein the command signal generated by the computing device corresponds to an audible signal.

3. The vehicle network and control system of claim 1, wherein the computing device is configured to generate the command signal when the attitude CAN frame indicates that at least one of the roll angle or the pitch angle has reached a threshold number of degrees.

4. The vehicle network and control system of claim 1, further comprising a vehicle integration module (VIM) linked to the CAN-Bus and configured to monitor the attitude data from the IMU, the VIM being further configured to transmit control data to the lawn mowing vehicle upon (i) a measured roll angle exceeding a predetermined threshold number of roll degrees is reached, or (ii) a measured pitch angle exceeding a predetermined threshold number of pitch degrees is reached.

5. The vehicle network and control system of claim 1, wherein the computing device is disposed on the lawn mowing vehicle.

6. A vehicle having a plurality of drive and control components, the vehicle comprising:
   a CAN-Bus residing on the vehicle and linked to the plurality of drive and control components;
   a plurality of sensors disposed on the vehicle and linked to the CAN-Bus, each sensor being capable of sensing at least one characteristic of the vehicle,
   wherein each of the plurality of drive and control components is capable of generating a separate component CAN frame indicative of a current status of each of the plurality of drive and control components, and wherein each of the plurality of sensors is capable of generating a separate sensor CAN frame indicative of a current status of at least one characteristic of the vehicle, whereby a plurality of CAN frames comprising the separate component CAN frames and the separate sensor CAN frames are generated;

a transmitter connected to the CAN-Bus and capable of transmitting each of the separate component and sensor CAN frames for comparison of the plurality of CAN frames and generation of a command signal based on the comparison of the CAN frames; and wherein the command signal is used to provide feedback to an operator of the vehicle and is generated when a first of the separate component and sensor CAN frames is inconsistent with a second of the separate component and sensor CAN frames.

7. The vehicle of claim 6, wherein the first of the separate component and sensor CAN frames corresponds to a status of at least one brake, and the second of the separate component and sensor CAN frames corresponds to a status of at least one control mechanism for affecting a speed and direction of the vehicle.

8. The vehicle of claim 7, wherein the command signal is generated when the first of the separate component and sensor CAN frames indicates that the at least one brake is engaged, and the second of the separate component and sensor CAN frames indicates that the at least one control mechanism is in a non-neutral position.

9. The vehicle of claim 6, wherein the plurality of drive and control components comprises:

a prime mover driving a first transaxle and a second transaxle, each transaxle driving one of a first drive wheel and a second drive wheel;

a first brake associated with the first transaxle to provide a first braking force to the first drive wheel, and a second brake associated with the second transaxle to provide a second braking force to the second drive wheel, and a first control mechanism associated with the first transaxle to control an output thereof and a second control mechanism associated with the second transaxle to control an output thereof; and wherein the first of the separate component and sensor CAN frames corresponds to a status of the at least one of the first brake or the second brake, and the second of the separate component and sensor CAN frames corresponds to a status of the at least one of the first control mechanism or the second control mechanism, and the command signal is generated when the first of the separate component and sensor CAN frames indicates that at least one of the first brake or the second brake is engaged, and the second of the separate component and sensor CAN frames indicates that at least one of the first control mechanism or the second control mechanism is in a non-neutral position.

10. The vehicle of claim 9, wherein when the first of the separate component and sensor CAN frames indicates that at least one of the first brake or the second brake is engaged, and the second of the separate component and sensor CAN frames indicates that at least one of the first control mechanism or the second control mechanism is in the non-neutral position, a programmed interlock prevents the first transaxle and the second transaxle from moving out of a neutral position.

11. The vehicle of claim 6, further comprising a computing device for performing the comparison of the plurality of CAN frames and generating the command signal.

12. The vehicle of claim 6, wherein the transmitter connected to the CAN-Bus transmits the separate component and sensor CAN frames to a remote computing device for comparison.

13. The vehicle of claim 6, wherein the feedback to the operator of the vehicle is audible feedback.

14. The vehicle of claim 13, further comprising a speaker capable of outputting the audible feedback.

15. The vehicle of claim 6, wherein the feedback to the operator of the vehicle is a visual message.

16. The vehicle network and control system of claim 4, wherein the control data corresponds to a change in a speed or direction of the vehicle.

17. The vehicle network and control system of claim 1, wherein the IMU comprises a magnetometer, an accelerometer, and a gyroscope.

18. The vehicle network and control system of claim 17, wherein the IMU further comprises a microprocessor configured to fuse output of the magnetometer, the accelerometer and the gyroscope to generate the attitude CAN frame.

19. The vehicle network and control system of claim 1, wherein the feedback further identifies vehicle levelness or movement irregularities when indicated by the attitude data.

20. The vehicle network and control system of claim 1, wherein the feedback is a visual message to the operator of the lawn mowing vehicle.

* * * * *